US012726511B2

(12) United States Patent
Criscione et al.

(10) Patent No.: US 12,726,511 B2
(45) Date of Patent: Sep. 1, 2026

(54) PREVENTING NETWORK RESOURCE TAKEOVER

(71) Applicant: Google LLC, Mountain View, CA (US)

(72) Inventors: Claudio Criscione, Milan (IT); Pierre Precourt, Zürich (CH); Patrick Spiegel, Zürich (CH)

(73) Assignee: Google LLC, Mountain View, CA (US)

( * ) Notice: Subject to any disclaimer, the term of this patent is extended or adjusted under 35 U.S.C. 154(b) by 7 days.

(21) Appl. No.: 18/943,570

(22) Filed: Nov. 11, 2024

(65) Prior Publication Data

US 2026/0135873 A1 May 14, 2026

(51) Int. Cl.
*H04L 9/40* (2022.01)

(52) U.S. Cl.
CPC ................................ *H04L 63/1441* (2013.01)

(58) Field of Classification Search
CPC .................................................. H04L 63/1441
See application file for complete search history.

(56) References Cited

U.S. PATENT DOCUMENTS 11,245,717 B1 2/2022 Edwards et al.
12,184,604 B2* 12/2024 DeLuca ................ H04L 9/3247
2013/0007271 A1* 1/2013 Stout ................... H04L 63/1441 709/224
2013/0254179 A1* 9/2013 Tan ..................... G06F 16/9538 707/706
2018/0063174 A1* 3/2018 Grill ................... H04L 63/0236
2021/0084071 A1* 3/2021 Mandrychenko ... H04L 63/1483
2021/0248624 A1* 8/2021 Keren .................. G06Q 50/184
2022/0321596 A1* 10/2022 Weizman ............ H04L 61/4511
2023/0130115 A1* 4/2023 Liu ..................... H04L 61/4511 726/1
2025/0371136 A1* 12/2025 Weizman .............. G06F 21/552
2026/0017737 A1* 1/2026 Kartoun ............... G06Q 50/184

OTHER PUBLICATIONS

Liu, et al., "Dangling Domains: Security Threats, Detection and Prevalence," PaloAlto Networks, Unit 42, published Sep. 16, 2021, pp. 1-15, accessed as early as Apr. 29, 2024. https://unit42.paloaltonetworks.com/dangling-domains/.

Lanfear et al., "Prevent dangling DNS entries and avoid subdomain takeover," Microsoft Learn, Azure, published Mar. 27, 2024, pp. 1-7, accessed as early as Apr. 29, 2024. https://learn.microsoft.com/en-us/azure/security/fundamentals/subdomain-takeover.

AWS Developer Guide, Amazon Route 53, "Protection from dangling delegation records in Route 53," Amazon Web Services, Inc., pp. accessed as early as Apr. 29, 2024. https://docs.aws.amazon.com/Route53/latest/DeveloperGuide/protection-from-dangling-dns.html.

Liu et al., "All Your DNS Records Point to Us," CCS'16, Oct. 24-28, 2016, Vienna, Austria, pp. 1414-1425, accessed as early as Apr. 29, 2024. http://dx.doi.org/10.1145/2976749.2978387.

* cited by examiner

*Primary Examiner* — Darren B Schwartz
(74) *Attorney, Agent, or Firm* — Lowenstein Sandler LLP

(57) ABSTRACT

Security data associated with a specified entity is received by one or more processing devices of a security analytics platform. The security data is parsed and a network domain name that is not associated with any computing resources associated with the specified entity is identified. An association is created between the network domain name and a computing resource controlled by the security analytics platform, thus preventing a third party from exploiting the network domain name.

20 Claims, 6 Drawing Sheets

FIG. 6

PREVENTING NETWORK RESOURCE TAKEOVER

TECHNICAL FIELD

Aspects and implementations of the disclosure relate to network security, and more specifically, to preventing network resource takeover.

BACKGROUND

Domain (subdomain) takeover happens when a malicious entity gains control of the contents or resources served by a subdomain belonging to another (victim) entity. This situation may occur due to domain name system (DNS) misconfigurations.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, by one or more processing devices of a security analytics platform, security data associated with a specified entity; identifying, by parsing the security data, a network domain name that is not associated with any computing resources associated with the specified entity; and creating an association between the network domain name and a computing resource controlled by the security analytics platform, thus preventing a third party from exploiting the network domain name.

In one implementation, identifying the network domain name further includes determining whether each network domain name referenced by the security data is associated with a computing resource.

In one implementation, the method further includes notifying an owner of the network domain name of the association.

In one implementation, the method further includes removing the association between the network domain name and the computing resource controlled by the security analytics platform responsive to receiving a command from an owner of the network domain name.

In one implementation, creating the association between the network domain name and the computing resource controlled by the security analytics platform is based on one or more settings received from the specified entity. In some implementations, the one or more settings received from the specified entity may specify a remediation action associated with the network domain name.

In one implementation, the method further includes selecting the computing resource controlled by the security analytics platform based on a computing resource type associated with the network domain name.

In one implementation, the method further includes creating a new computing resource associated with the specified entity and creating an association between the network domain name and the new computing resource, thus preventing a third party from exploiting the network domain name.

In an aspect of the disclosure, a method includes receiving, by one or more processing devices of a security analytics platform, security data associated with a specified entity; identifying, by parsing the security data, a computing resource that is not associated with a valid network domain name; and creating an association between the computing resource and a network domain name controlled by the security analytics platform, thus preventing a third party from exploiting the computing resource.

In one implementation, creating the association between the computing resource and the network domain name further includes registering the network domain name to an entity controlled by the security analytics platform.

In one implementation, identifying the computing resource further includes determining whether each computing resource referenced by the security data is associated with a network domain name.

In one implementation, the method further includes notifying an owner of the computing resource of creating the association between the computing resource and the network domain name controlled by the security analytics platform.

In one implementation, the method further includes transferring ownership of the network domain name to an owner of the computing resource responsive to receiving a command from the owner of the computing resource.

In one implementation, creating an association between the computing resource and the network domain name controlled by the security analytics platform is based on one or more settings received from the specified entity to specify a remediation action associated with the computing resource.

In one implementation, the method further includes selecting the network domain name controlled by the security analytics platform responsive to a network domain name type associated with the computing resource.

In an aspect of the disclosure, a system includes a memory and one or more processing devices of a security analytics platform operatively coupled to the memory, the one or more processing devices to perform operations. The operations include receiving, by the one or more processing devices, security data associated with a specified entity; identifying, by parsing the security data, a first digital asset that is not associated with any other digital asset associated with the specified entity; and creating an association between the first digital asset and a second digital asset controlled by the security analytics platform, thus preventing a third party from exploiting the first digital asset.

In one implementation, identifying the first digital asset further includes determining whether each digital asset referenced by the security data is associated with any other digital asset.

In one implementation, the operations further include notifying an owner of the first digital asset of the association.

In one implementation, the operations further include removing the association between the first digital asset and the second digital asset responsive to receiving a command from an owner of the first digital asset.

In one implementation, the operations further include selecting the second digital asset controlled by the security analytics platform based on a digital asset type associated with the first digital asset.

In an aspect of the disclosure, a processor-readable memory, which may be a non-transitory memory although this aspect is not limited to this, stores instructions that, when executed by the processing device, cause the processing device to perform a method according to any aspect or implementation described herein.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementation, but are for explanation and understanding.

FIG. 6 is a block diagram illustrating one implementation of a computer system, in accordance with an implementation of the disclosure.

DETAILED DESCRIPTION

Figure 1:
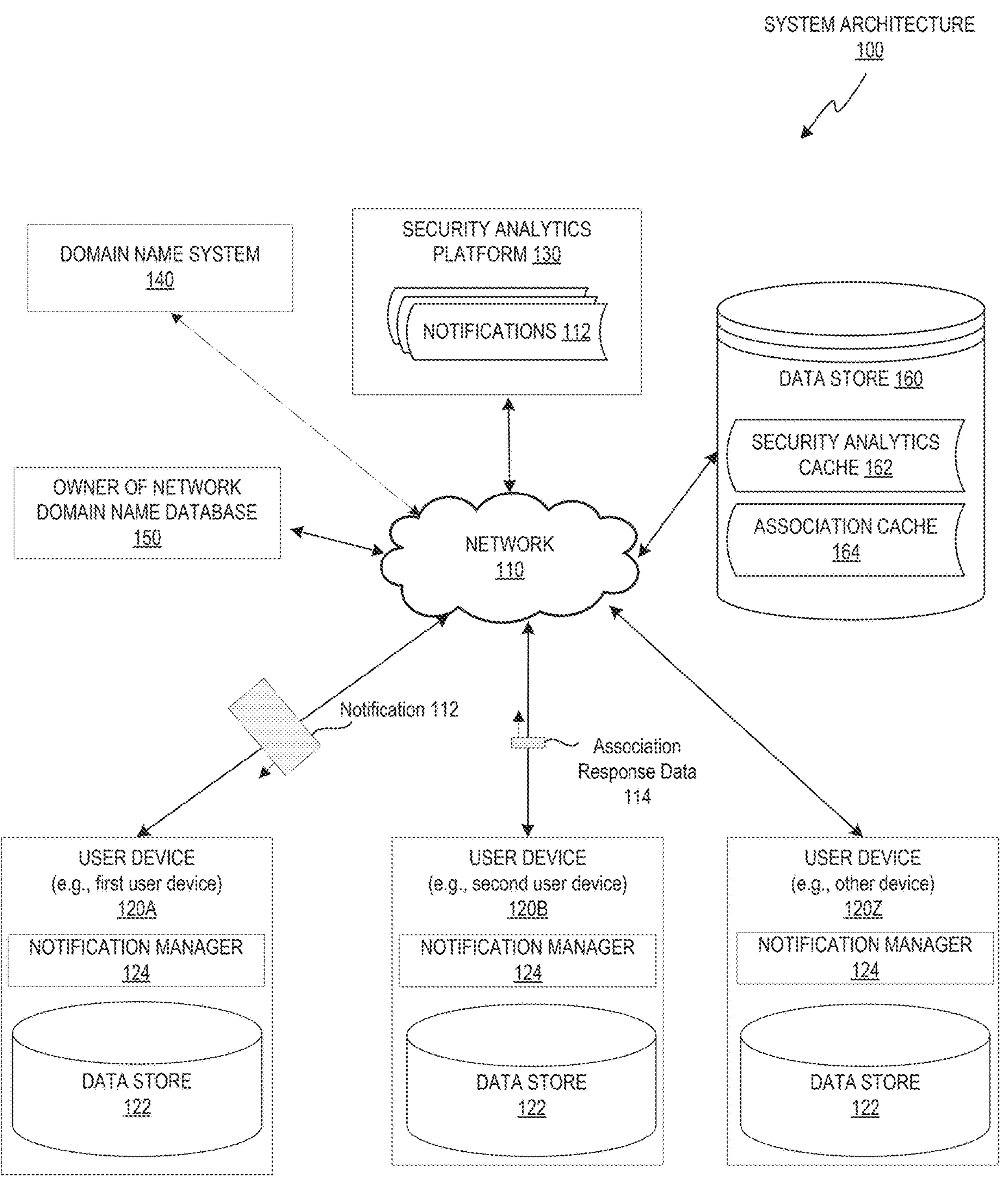
FIG. 1 is a block diagram illustrating an example security analytics platform architecture, in accordance with an implementation of the disclosure.

Aspects and implementations of the disclosure are directed to preventing network resource takeover by malicious third parties. Examples of "resources" or "computing resources" include an online service, a server, a system, a web application, an electronic mail server, and a cloud service.

A computing resource may thus be identified by its network domain name (e.g., example.com) and optional other computing resource identifying information, such as a pathname in the filesystem of a server identified by the domain name. The computing resource access request may further include one or more parameters, which may, e.g., be incorporated into the universal resource locator (URL) in the form of name-value pairs.

The domain names may be managed by the Domain Name System (DNS), which is a hierarchical distributed name service that provides a naming system for computers, services, and other resources on the Internet or other Internet Protocol (IP) networks. It translates alphanumeric domain names to corresponding IP addresses that can be utilized for identifying computer services and devices with the underlying network protocols.

The domain name space may be represented by a tree data structure. Each node of the tree has an alphanumeric label and zero or more resource records (RR), which hold information associated with the domain name. The domain name itself is the label, concatenated with the name of its parent node on the right, separated by a dot. Thus, the hierarchy of domains descends from right to left; each label to the left specifies a subdivision, or subdomain of the domain to the right. For example, in www.example.com, the label example specifies a subdomain of the com domain, and www is a subdomain of example.com. Any references to "domain" herein shall be understood as referring to a domain or a subdomain.

The Domain Name System is maintained by a distributed database system, which uses the client-server model. The nodes of this database are the name servers. Each domain has at least one authoritative DNS server that publishes information about that domain and the name servers of any domains subordinate to it.

Thus, a network domain may refer to a collection of computers, other devices, and computing resources that are managed as a single unit under common administrative policies and permissions.

A network domain that is not associated with any computing resource may be vulnerable to domain takeover, which may involve a malicious third party associating a computing resource with the domain name (e.g., by claiming the resource internet protocol (IP) address the DNS records are pointing to). Such vulnerability may be caused by the domain owner removing or releasing usage of a resource while leaving active the domain that was previously associated with the resource.

A third party may exploit this "dangling" vulnerability and be able to gain control of the affected domain itself. In an example scenario, the third party may then be able to attach its own computing resource to the affected domain, making it appear as though anything coming from this domain is officially affiliated with the domain. For example, if a third party were to attach its own electronic mail server to a dangling subdomain of "mail.example.com", any electronic mail message sent from this computing resource would appear to be officially affiliated with example.com.

Conversely, a reverse domain takeover may occur when a computing resource is mapped to a non-existent or unresolvable domain name (e.g., the computing resource is not associated with a valid network domain name). This would allow a third party to claim the domain (e.g., by registering the domain to itself), thus taking control of that resource.

Both vulnerabilities associated with domain takeovers and reverse domain takeovers may be detected and resolved, e.g., by notifying the owner of the computing resource or the domain of the uncovered vulnerability. This, however, would leave the affected domain or computing resource vulnerable to attacks for as long as it takes for the owner to react and take remediation steps, which could range from minutes to hours, days, or longer.

The systems and methods disclosed herein are directed to preventing network resource takeover by taking preemptive remediation steps immediately upon discovering the vulnerabilities.

In some implementations, a security analytics platform may receive security data associated with a specified entity (e.g., an organization, an enterprise network, or the like). The security analytics platform may identify, by parsing the security data, a network domain name that is not associated with any computing resources (e.g., points to a non-existent resource or no resource) associated with the specified entity. The security analytics platform may immediately take preemptive remediation steps, thus preventing a third party from taking over (e.g., exploiting) the network domain. In particular, the security analytics platform may create an association between the network domain name with a computing resource controlled by the security analytics platform, so that the network domain name would no longer point to a non-existent computing resource or no resource.

This would effectively remove the detected vulnerability, thus preventing any third parties from taking over the network domain name.

In some implementations, a security analytics platform may receive security data associated with a specified entity. The security analytics platform may identify, by parsing the security data, a computing resource that is not associated with a valid network domain name. The security analytics platform may immediately take preemptive remediation steps, thus preventing a third party from taking over (e.g., exploiting) the computing resource. In particular, the security analytics platform may create an association between the computing resource and a network domain name controlled by the security analytics platform. This would effectively remove the detected vulnerability, thus preventing any third parties from taking over the computing resource.

Aspects of the present disclosure address the above-noted and other problems of conventional solutions by detecting one of the above-described domain name misconfigurations and immediately performing remediating operations. For example, if a dangling domain name is identified by the security analytics platform, the remediating operations may involve associating the domain name with a computing resource that is controlled by the security analytics platform. Conversely, if a computing resource is identified that is not associated with a valid network domain name, the remediating operations may involve registering the domain, thus preventing a takeover of the domain by a third party. Finally, the system may notify the owner of the computing resource of the vulnerability and the steps taken to mitigate that vulnerability. Once the owner takes the necessary steps to address the original vulnerability, the system may reverse the remediation steps taken by the system.

The systems and methods disclosed herein have technical advantages over conventional solutions. In some implementations, the present disclosure associates a dangling network domain or subdomain to an existing computing resource to extinguish the dangling vulnerability and prevent a third party from exploiting or gaining control of the associated domain or subdomain. In some implementations, the present disclosure associates a dangling computing resource with an existing network domain or subdomain to prevent a third party from exploiting or taking control of the computing resource. In some implementations, the present disclosure automatically implements remediating operations without requiring owner response, eliminating the delay between when the vulnerability is identified and when remediation is taken.

FIG. 1 is a block diagram illustrating an example security analytics platform architecture 100, in accordance with one implementation of the disclosure. The system architecture 100 includes a network 110, user devices 120A-Z, security analytics platform 130, a domain name server 140, an owner of network domain name database 150, and a data store 160.

Network 110 may be a public network that provides one or more of user devices 120A-Z with access to security analytics platform 130, domain name server 140, owner of network domain name database 150, and other publicly available computing devices. Network 110 may include one or more wide area networks (WANs), local area networks (LANs), wired networks (e.g., Ethernet network), wireless networks (e.g., an 802.11 network or a wide local area network (WLAN)), cellular networks (e.g., a Long Term Evolution (LTE) network), routers, hubs, switches, server computers, and/or a combination thereof.

User devices 120A-Z may each include computing devices such as personal computers (PCs), laptops, mobile phones, smart phones, tablet computers, netbook computers, network-connected televisions, etc. User devices 120A-Z may be capable of accessing domain name server (DNS) 140 to retrieve DNS records. User devices 120A-Z may also be capable of accessing an owner of network domain name database 150 (e.g., a WHOIS lookup that provides information about a domain's registrant, registrar, and other related details). User devices 120A-Z may be capable of receiving a notification 112 from the security analytics platform 130 and sending an association response data 114 back to the security analytics platform 130. These actions may, in some implementations, be coordinated and managed by a notification manager 124. These will be discussed in more detail below.

Security analytics platform 130 may identify a particular entity that corresponds to available security data. For example, security analytics platform 130 may receive security data from a variety of sources (e.g., traffic logs, firewall logs, application logs, etc.), with the security data being associated with a given entity (e.g., web address, domain, subdomain, application, etc.). The security analytics platform 130 may sort the security data by entity in order to analyze the security posture of the entity for each piece of security data. For example, when the security data is received, it may contain entries of requests and responses collected via traffic logs of a server or reverse proxy. The security analytics platform 130 may sort the security data according to the entity (e.g., a distinct component or actor, such as a user, device, application, or service) associated with the data entry. This may allow the security analytics platform 130 to create an association with other digital assets owned and/or controlled by the same entity, thus preventing a third party from creating a similar association with a digital asset owned by the third party.

The security analytics platform 130 may receive and sort the security data. In some implementations, the security analytics platform 130 may receive the security data for a single entity per instance and/or for multiple entities per instance. The security data may include domain names, subdomain names, computing resources, and other similar data. In some implementations, the security analytics platform 130 may parse the data (e.g., analyze and convert a string of data into a structured format that may be understood by the security analytics platform 130). In some implementations, parsing the data may include producing a list with network domain names in a first column and the related computing resource in a second column.

In some implementations, the security analytics platform 130 may ingest the security data per entity and parse it by placing a network domain name in a first column and the associated computing resource (e.g., the computing resource that is registered to the network domain name) in a second column. In some implementations, the security data may be parsed per entity by placing a network subdomain name in a first column and the associated computing resource in a second column. This means that a network domain or subdomain name in the first column that does not have a computing resource associated with it will correspond to a null value in the second column.

The security analytics platform 130 may ingest the security data per entity and parse it by placing a computing resource in a first column and the associated (e.g., registered) network domain name in a second column. This means that a computing resource in the first column that does not have a network domain name associated with it (or is associated with an unresolvable network domain or subdomain name) will correspond to a null value in the second column.

The security analytics platform 130 may create an association to mitigate a security risk to either a network domain name or computing resource. In some implementations, the security analytics platform 130 may create an association between a network domain name that has no computing resource with a computing resource owned and/or controlled by the entity identified previously by the security analytics platform 130. In some implementations, the security analytics platform 130 may create an association between a computing resource not registered to a valid network domain name by creating an association between the computing resource and a network domain name controlled by the security analytics platform 130. In some implementations, creating an association between the computing resource and the network domain name may include registering the network domain name to an entity controlled by the security analytics platform 130. In these and other implementations, the entity, network domain name, and/or computing resource may all be owned and/or controlled by the same entity (e.g., an organization, an enterprise network, or the like).

The security analytics platform 130 may create an association between a digital asset without an association and another digital asset belonging to the same entity. In some implementations, the security analytics platform 130 may include a set of actuators (digital or physical) to create the association. In some implementations, the security analytics platform 130 may select a digital asset with which to create the association based on one or more settings received from the specified entity. For example, if a network domain name were no longer associated with a computing resource, and the computing resource it was previously associated with was a cloud service, the security analytics platform 130 may leverage an account with the cloud service owned by the digital asset owner to create the association with the cloud service. As another example, if a computing resource were associated with an invalid network domain name, the security analytics platform 130 may register the invalid network domain name with the DNS.

In some implementations, the security analytics platform 130 may remove an association between the digital asset without an association and another digital asset responsive to the owner of the digital asset confirming that mitigation steps have been taken.

The security analytics platform 130 may send a notification 112 to the owner of the digital asset that was identified as having no association with another digital asset (e.g., a network domain name that is not associated with a computing resource, a computing resource that is not registered to a network subdomain name, etc.). The notification 112 may, in some implementations, notify the owner of the association created by the security analytics platform 130. The owner may then send association response data 114 via user device 120 A-Z to either keep the association (e.g., have the association remain intact) or confirm that other mitigating steps have been taken. In some implementations, if the owner confirms that other mitigating steps have been taken, the security analytics platform 130 may remove the association created to mitigate vulnerability.

Data store 160 may include a security analytics cache 162 that stores one or more of instructions that are to be transmitted to security analytics platform 130 to prevent a third party attack. Data store 160 may include an association cache 164 that stores association response data 114 (e.g., data regarding an acknowledgement from an entity owner of the association made and the action taken). In some implementations, the association response data 114 may be sent from a user device 120A-Z and stored in the association cache 164 to be retrieved by security analytics platform 130 and remove the association created previously to prevent a third party attack.

In situations in which the systems discussed here collect personal information about users, or may make use of personal information, the users can be provided with an opportunity to control whether security analytics platform 130 collects user information (e.g., information about a user's social network, social actions or activities, profession, a user's preferences, or a user's current location), or to control whether and/or how to receive content from a server that can be more relevant to the user. In addition, certain data can be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the security analytics platform 130.

FIGS. 2A-B, 3A-B, and 4-5 depict flow diagrams for illustrative examples of methods 200A-B, 300 A-B, 400, and 500 for preventing an attack from a malicious third part. Methods 200A-B, 300 A-B, 400, and/or 500 and/or each of the aforementioned methods' individual functions, routines, subroutines, or operations may be performed by a processing device, having one or more processing units (CPU) and memory devices communicatively couples to the CPU(s). In some implementations, the aforementioned methods can be performed by a single processing thread or alternatively by two or more processing threads, each thread executing one or more individual functions, routines, subroutines, or operations of the method. The aforementioned methods as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, methods 200A-B, 300 A-B, 400, and 500 may be performed by security analytics platform 130 described in FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows may be possible. In some implementations, the same, different, fewer, or greater operations may be performed. It may be noted that elements of FIG. 1 may be used herein to help describe FIGS. 2A-B, 3A-B, and 4-5.

Figure 2A:
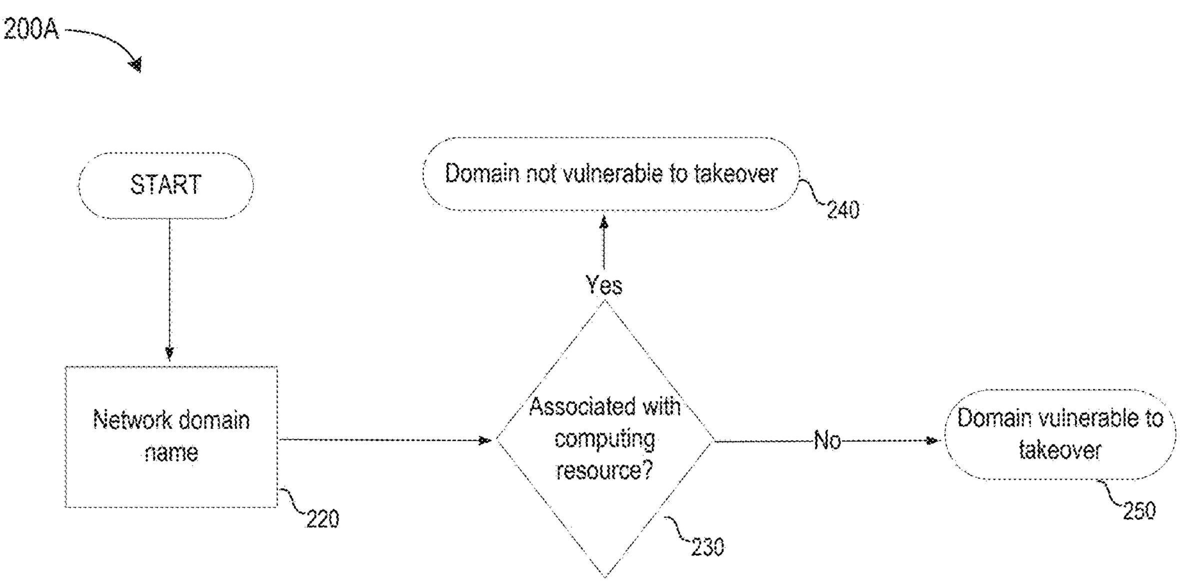
FIGS. 2A-B are flow diagrams illustrating an example of a domain takeover with and without immediate preemptive remediation steps, in accordance with an implementation of the disclosure.
Figure 2B:
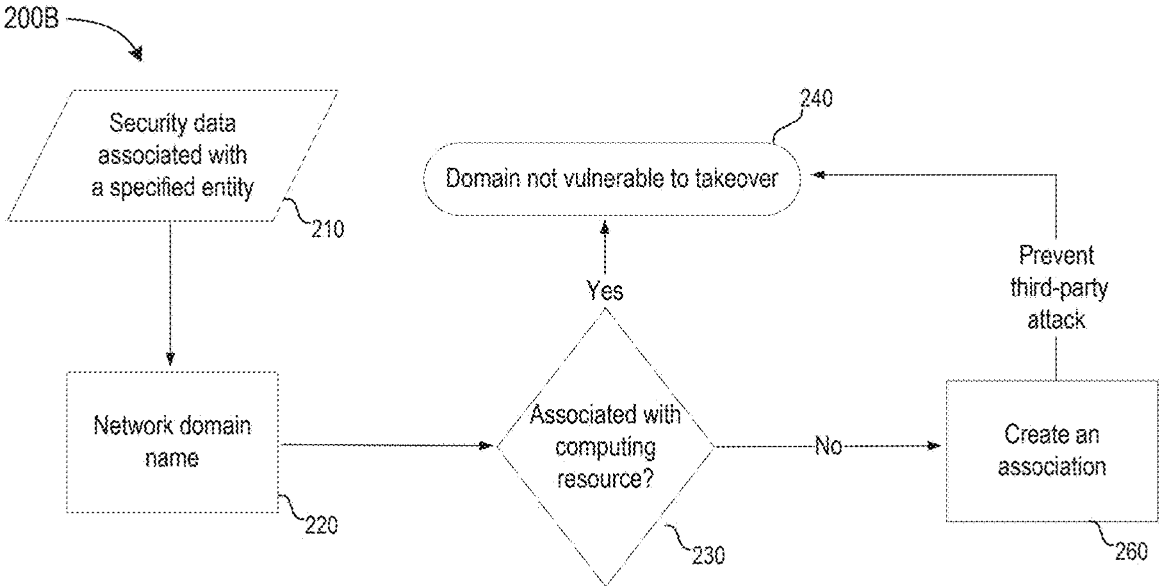

FIGS. 2A-B are flow diagrams illustrating an example of a domain takeover with and without immediate preemptive remediation steps. FIG. 2A is a flow diagram illustrating a conventional example of a domain takeover without immediate preemptive remediation steps. FIG. 2B is a flow diagram illustrating an example of a security analytics platform taking immediate preemptive remediation steps to prevent domain takeover.

FIG. 2A is a flow diagram illustrating a conventional example method 200A of a domain takeover without immediate preemptive remediation steps.

Network domain name 220 may or may not be associated with a computing resource controlled by a specified entity (e.g., an organization, an enterprise network, or the like), as indicated by decision 230. If the network domain name 220 is associated with a computing resource controlled by the specified entity, the network domain name 220 is not vulnerable to takeover, as indicated at step 240. If the network domain name 220 is not associated with a computing resource controlled by the specified entity, the network domain name 220 is vulnerable to takeover, as indicated at step 250. A third-party may attempt to exploit this vulnerability by associating a computing resource controlled by the third-party with the network domain name 220.

FIG. 2B is a flow diagram illustrating an example method 200B illustrating an example of a security analytics platform (e.g., the security analytics platform 130 of FIG. 1) taking immediate preemptive remediation steps to prevent domain takeover.

The security analytics platform may receive security data associated with a specified entity, as indicated by data 210. The security analytics platform may identify a network domain name 220 associated with the specified entity. At decision 230, the security analytics platform may determine whether the network domain name 220 is associated with a computing resource controlled by the specified entity. If the network domain name 220 is associated with a computing resource controlled by the specified entity, the network domain name 220 is not vulnerable to takeover, as indicated at step 240. If the network domain name 220 is not associated with a computing resource controlled by the specified entity, the security analytics platform may create an association 260 between the network domain name 220 and a computing resource controlled by the specified entity or by the security analytics platform itself, thus preventing a third-party attack by taking immediate preemptive remediation steps.

Figure 3A:
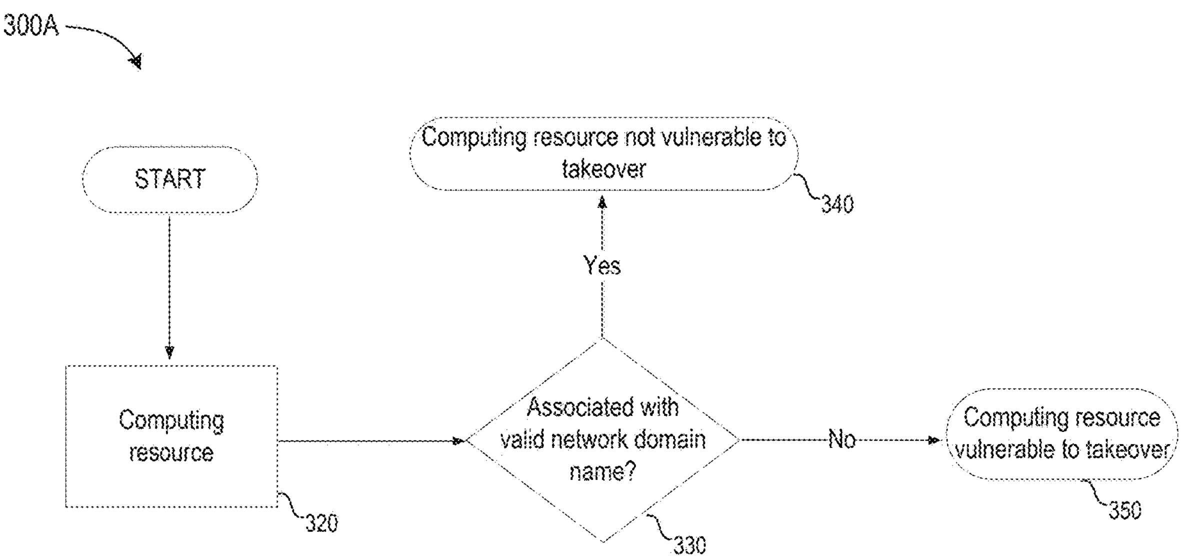
FIGS. 3A-B are flow diagrams illustrating an example of a reverse domain takeover with and without immediate preemptive remediation steps, in accordance with an implementation of the disclosure.
Figure 3B:
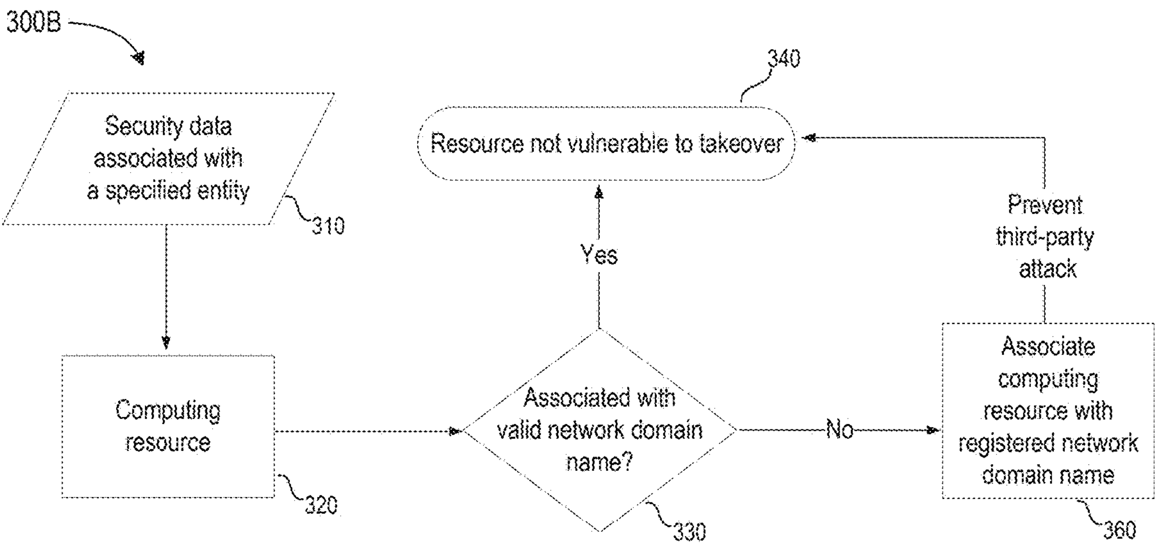

FIGS. 3A-B are flow diagrams illustrating an example of a reverse domain takeover with and without immediate preemptive remediation steps. FIG. 3A is a flow diagram illustrating a conventional example of a reverse domain takeover without immediate preemptive remediation steps. FIG. 3B is a flow diagram illustrating an example of a security analytics platform taking immediate preemptive remediation steps to prevent reverse domain takeover.

FIG. 3A is a flow diagram illustrating a conventional example method 300A of a reverse domain takeover without immediate preemptive remediation steps.

Computing resource 320 may or may not be associated with a valid network domain name, as indicated by decision 330. If the computing resource 320 is associated with a valid (i.e., resolvable) network domain name, the computing resource is not vulnerable to takeover, as indicated at step 340. If the computing resource 320 is not associated with a valid network domain name (e.g., if the domain name associated with the resource 320 is non-existent (i.e., non-resolvable), the computing resource 320 is vulnerable to takeover, as indicated at step 350. A third-party may attempt to exploit this vulnerability by registering the non-existent network domain name and taking control of the resource 320.

FIG. 3B is a flow diagram illustrating an example method 300B illustrating an example of a security analytics platform (e.g., the security analytics platform 130 of FIG. 1) taking immediate preemptive remediation steps to prevent reverse domain takeover.

The security analytics platform may receive security data associated with a specified entity, as indicated by data 310. The security analytics platform may identify a computing resource 320 associated with the specified entity. At decision 330, the security analytics platform may determine whether the computing resource 320 is associated with a valid network domain name. If the computing resource 320 is associated with a valid network domain name, the computing resource 320 is not vulnerable to takeover, as indicated at step 340. If the computing resource 320 is not associated with a valid network domain name, the security analytics platform may associate the computing resource 320 with a network domain name that is registered to the specified entity or to the security analytics platform itself, as indicated by preemptive immediate remediation step 360. The preemptive immediate remediation step 360 thus prevents a third-party attack.

Figure 4:
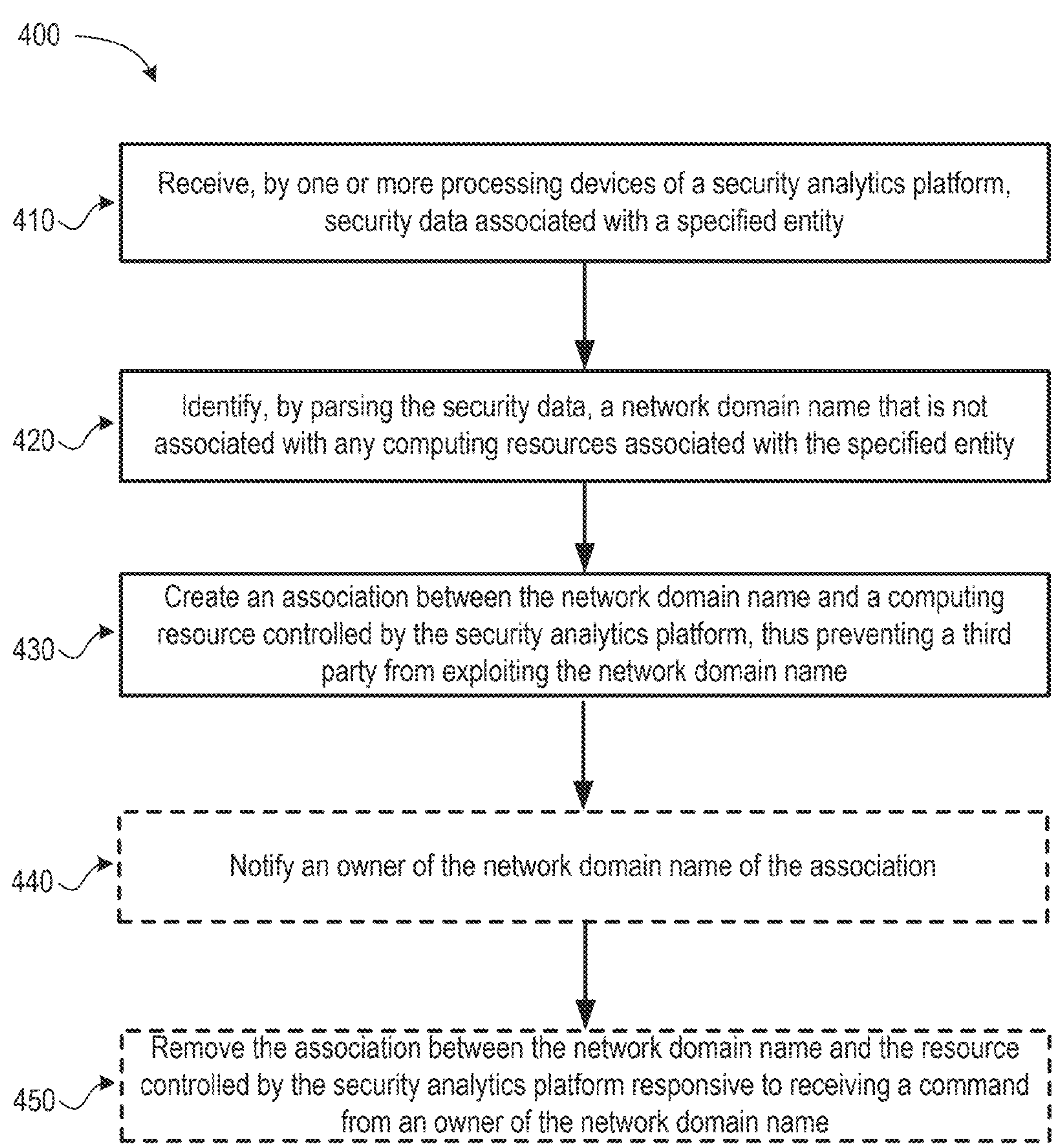
FIG. 4 is a flow diagram illustrating an example method of preventing a third party from exploiting a network domain name, in accordance with an implementation of the disclosure.

FIG. 4 is a flow diagram illustrating an example method 400 of preventing a third party from exploiting a network domain name, in accordance with an implementation of the disclosure.

At operation 410, one or more processing devices of a security analytics platform may receive security data associated with a specified entity.

At operation 420, the security analytics platform may identify, by parsing the security data, a network domain name that is not associated with any computing resources associated with the specified entity. In some implementations, identifying the network domain name may further include determining whether each network domain name referenced by the security data is associated with a computing resource.

At operation 430, the security analytics platform may create an association between the network domain name and a computing resource controlled by the security analytics platform, thus preventing a third party from exploiting the network domain name. In some implementations, creating the association between the network domain name and the computing resource controlled by the security analytics platform may be based on one or more settings received from the specified entity. In some implementations, the one or more settings received from the specified entity may specify a remediation action associated with the network domain name. In some implementations, selecting the computing resource controlled by the security analytics platform may be responsive to a computing resource type associated with the network domain name.

In some implementations, the security analytics platform may create a new computing resource associated with the specified entity and create an association between the network domain name and the new computing resource, thus preventing a third party from exploiting the network domain name.

At operation 440, the security analytics platform may notify an owner of the network domain name of the association created at operation 430.

At operation 450, the security analytics platform may remove the association created at operation 430 between the network domain name and the computing resource controlled by the security analytics platform responsive to receiving a command from an owner of the network domain name.

Figure 5:
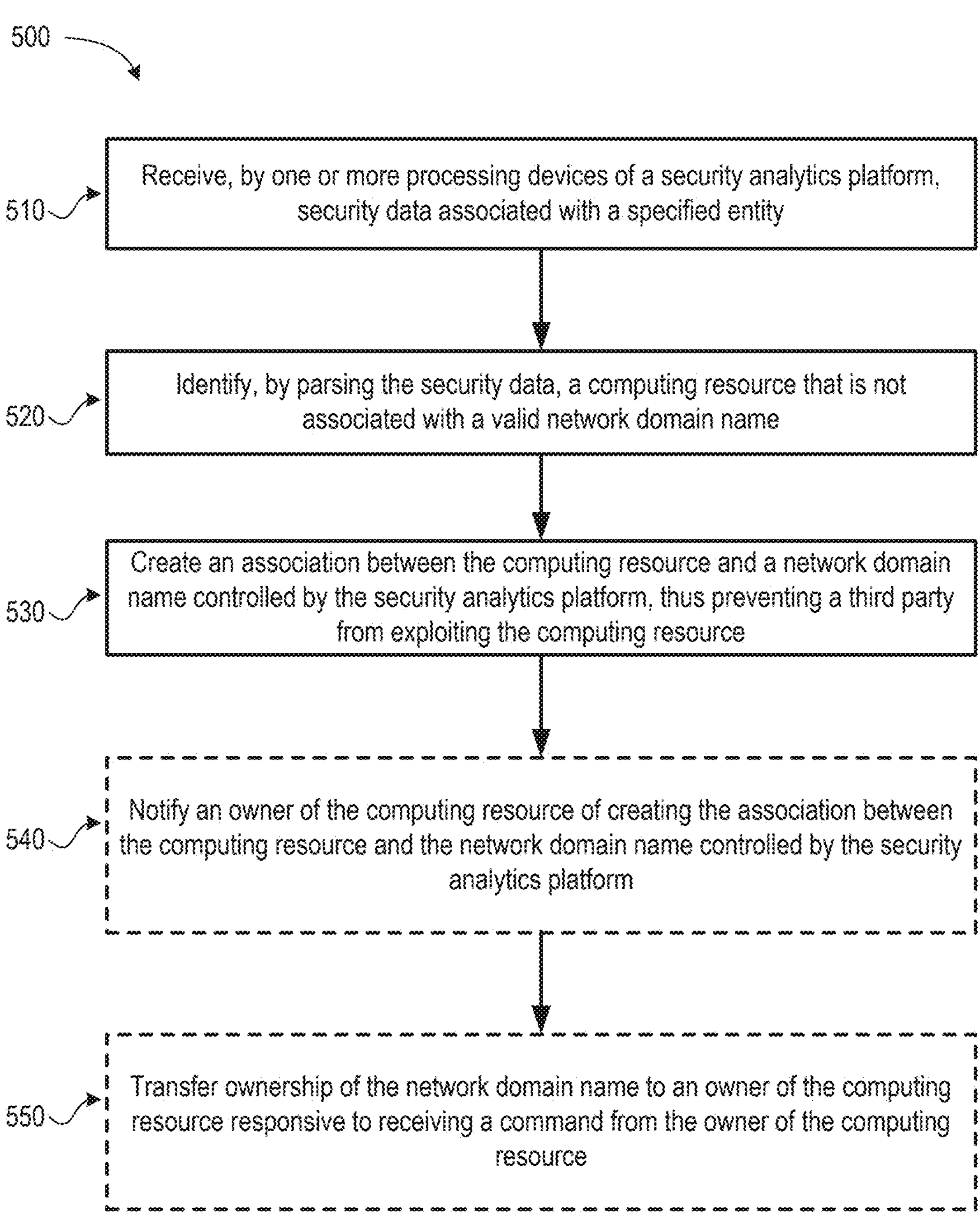
FIG. 5 is a flow diagram illustrating an example method of preventing a third party from exploiting a computing resource, in accordance with an implementation of the disclosure.

FIG. 5 is a flow diagram illustrating an example method 500 of preventing a third party from exploiting a computing resource, in accordance with an implementation of the disclosure.

At operation 510, one or more processing devices of a security analytics platform may receive security data associated with a specified entity.

At operation 520, the security analytics platform may identify, by parsing the security data, a computing resource that is not associated with a valid network domain name. In some implementations, identifying the computing resource may further include determining whether each computing resource referenced by the security data is associated with a network domain name.

At operation 530, the security analytics platform may create an association between the computing resource and a network domain name controlled by the security analytics platform, thus preventing a third party from exploiting the resource. In some implementations, creating the association between the computing resource and the network domain name may further include registering the network domain name to an entity controlled by the security analytics platform.

In some implementations, creating the association between the computing resource and the network domain name controlled by the security analytics platform may be based on one or more settings received from the specified entity to specify a remediation action associated with the resource. In some implementations, selecting the network domain name controlled by the security analytics platform may be responsive to a network domain name type associated with the computing resource.

At operation 540 the security analytics platform may notify an owner of the computing resource of creating the association between the resource with the network domain name controlled by the security analytics platform.

At operation 550, the security analytics platform may transfer the association between the resource and the network domain name controlled by the security analytics platform to an owner of the resource responsive to receiving a command from the owner of the resource.

Figure 6:
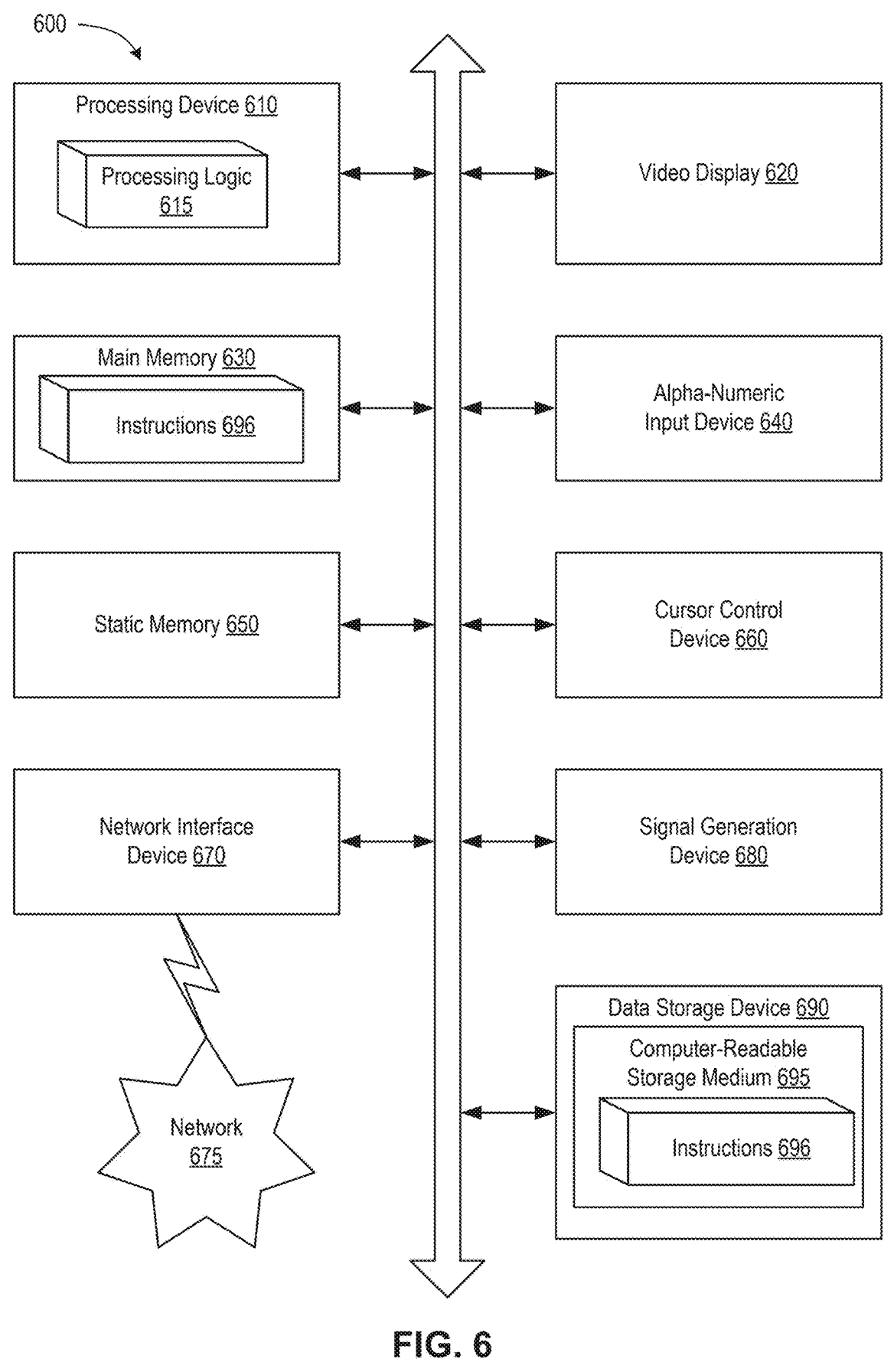

FIG. 6 is a block diagram illustrating one implementation of a computer system 600, in accordance with an implementation of the disclosure. In certain implementations, the computer system 600 executes one or more sets of instructions that cause the computer to perform any one or more of the methodologies discussed herein. Set of instructions, instructions, and the like may refer to instructions that, when executed by computer system 600, cause computer system 600 to perform one or more operations of security analytics platform 130. The computer may operate in the capacity of a server of a client device in a client-server network environment, or as a peer machine in a peer-to-peer (or distributed) network environment. The computer may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that computer. Further, while one a single computer is illustrated, the term "computer" shall also be taken to include any collection of computers that individually or jointly execute the sets of instructions to perform any one or more of the methodologies discussed herein.

In a further aspect, the computer system 600 may include a processing device 610, a main memory 630 (e.g., read-only memory (ROM), flash memory, dynamic random access memory (DRAM) such as synchronous DRAM (SDRAM) or Rambus DRAM (RDRAM), etc.), a static memory 650 (e.g., flash memory, static random access memory (SRAM), etc.), and a data storage device 690, which communicate with each other via a bus.

The processing device 610 may represent one or more general-purpose processing devices such as a microprocessor, central processing unit, or the like. More particularly, the processing device 610 may be a complex instruction set computing (CISC) microprocessor, reduced instruction set computing (RISC) microprocessor, very long instruction word (VLIW) microprocessor, or a processing device implementing other instruction sets or processing devices implementing a combination of instructions sets. The processing device 610 may also be one or more special-purpose processing devices such as an application specific integrated circuit (ASIC), a field programmable gate array (FPGA), a digital signal processor (DSP), network processor, or the like. The processing device 610 may include processing logic 615 configured to execute instructions of the system architecture 100 and security analytics platform 130 for performing the operations discussed herein.

The computer system 600 may further include a network interface device 670 that may provide communication with other computers over a network 675, such as a local area network (LAN), an intranet, an extranet, or the Internet. The computer system 600 may also include a video display 620 (e.g., a liquid crystal display (LCD) or a cathode ray tube (CRT)), an alpha-numeric input device 640 (e.g., a keyboard), a cursor control device 660 (e.g., a mouse), and a signal generation device 680 (e.g., a speaker).

The data storage device 690 may include a non-transitory computer-readable storage medium 695 on which may be stored the sets of instructions 696 of the system architecture 100 of security analytics platform 130 implementing any one or more of the methodologies or functions described herein. Ther sets of instructions 696 of the system architecture 100 and of security analytics platform 130 may also reside, completely or at least partially, within the main memory 630 and/or within the processing device 610 during execution thereof by the computer system 600, the main memory 630, and the processing device 610 also constituting computer-readable storage media. The sets of instructions 696 may further be transmitted or received over the network 675 via the network interface device 670.

While computer-readable storage medium 695 is shown in the illustrative examples as a single medium, the term "computer-readable storage medium" may include a single medium or multiple media (e.g., a centralized or distributed database, and/or associated caches and servers) that store the sets of instructions 696. The term "computer-readable storage medium" may include any medium that is capable of storing, encoding, or carrying a set of instructions 696 for execution by the computer and that causes the computer to perform any one or more of the methodologies of the disclosure. The term "computer-readable storage medium" may include, but not be limited to, solid-state memories, optical media, and magnetic media.

The methods, components, and features described herein may be implemented by discrete hardware components or may be integrated in the functionality of other hardware components such as ASICs, FPGAs, DSPs, or similar devices. In addition, the methods, components, and features may be implemented by firmware modules or functional circuitry within hardware devices. Further, the methods, components, and features my be implemented in any combination of hardware devices and computer program components, or in computer programs.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Unless specifically stated otherwise, it is appreciated that throughout the description, discussions utilizing terms such as "receiving", "identifying", "preventing", "notifying", "removing", "verifying", "locating", "transferring" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The word "example" is used herein to mean serving as an example, instance, or illustration. Any aspect or design described herein as an "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an aspect" or "one aspect" throughout is not intended to mean the same implementation or aspect unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:

receiving, by one or more processing devices of a security analytics platform, security data associated with a specified entity;

identifying, by parsing the security data, a network domain name that is not associated with any computing resources associated with the specified entity;

creating, by the one or more processing devices, an association between the network domain name and a computing resource controlled by the security analytics platform, wherein the association is maintained by the security analytics platform to prevent a third party from exploiting the network domain name;

generating a notification of the association for an owner of the network domain name; and removing the association between the network domain name and the computing resource controlled by the security analytics platform responsive to receiving a request of the owner of the network domain name.

2. The method of claim 1, wherein identifying the network domain name further comprises determining whether each network domain name referenced by the security data is associated with a computing resource.

3. The method of claim 1, wherein creating the association between the network domain name and the computing resource controlled by the security analytics platform is based on one or more settings received from the specified entity.

4. The method of claim 3, wherein the one or more settings received from the specified entity specify a remediation action associated with the network domain name.

5. The method of claim 1, further comprising: selecting the computing resource controlled by the security analytics platform based on a computing resource type associated with the network domain name.

6. The method of claim 1, further comprising:

creating a new computing resource associated with the specified entity; and creating an association between the network domain name and the new computing resource, thus preventing a third party from exploiting the network domain name.

7. The method of claim 1, wherein the association is created automatically by the security analytics platform without receiving authorization from the owner of the network domain name prior to notifying the owner of the network domain name.

8. The method of claim 1, further comprising selecting the computing resource controlled by the security analytics platform based on a type of association with the network domain name.

9. A method comprising:

receiving, by one or more processing devices of a security analytics platform, security data associated with a specified entity;

identifying, by parsing the security data, a computing resource that is not associated with a valid network domain name;

creating, by the security analytics platform, an association between the computing resource and a network domain name controlled by the security analytics platform, wherein the association is maintained by the security analytics platform to prevent a third party from exploiting the computing resource;

generating a notification of the association for an owner of the computing resource; and transferring ownership of the network domain name to the owner of the computing resource responsive to receiving a request of the owner of the computing resource.

10. The method of claim 9, wherein creating the association between the computing resource and the network domain name further comprises registering the network domain name to an entity controlled by the security analytics platform.

11. The method of claim 9, wherein identifying the computing resource further comprises determining whether each computing resource referenced by the security data is associated with a network domain name.

12. The method of claim 9, wherein creating an association between the computing resource and the network domain name controlled by the security analytics platform is based on one or more settings received from the specified entity to specify a remediation action associated with the computing resource.

13. The method of claim 9, further comprising: selecting the network domain name controlled by the security analytics platform based on a network domain name type associated with the computing resource.

14. The method of claim 9, wherein identifying the computing resource further comprises determining whether the computing resource is associated with a resolvable network domain name.

15. The method of claim 9, further comprising selecting the network domain name controlled by the security analytics platform based on a type associated with the computing resource.

16. A system comprising:

a non-transitory memory;

one or more processing devices of a security analytics platform operatively coupled to the non-transitory memory, the one or more processing devices to perform operations comprising:

receiving, by the one or more processing devices, security data associated with a specified entity;

identifying, by parsing the security data, a first digital asset that is not associated with any other digital asset associated with the specified entity;

creating, by the one or more processing devices, an association between the first digital asset and a second digital asset controlled by the security analytics platform, wherein the association is maintained by the security analytics platform to prevent a third party from exploiting the first digital asset;

generating a notification of the association for an owner of the first digital asset; and removing the association between the first digital asset and the second digital asset responsive to receiving a request of the owner of the first digital asset.

17. The system of claim 16, wherein identifying the first digital asset further comprises determining whether each digital asset referenced by the security data is associated with any other digital asset.

18. The system of claim 16, the one or more processing devices to perform operations further comprising: notifying the owner of the first digital asset of the association.

19. The system of claim 16, the one or more processing devices to perform operations further comprising: removing the association between the first digital asset and the second digital asset responsive to receiving a command from the owner of the first digital asset.

20. The system of claim 16, the one or more processing devices to perform operations further comprising: selecting the second digital asset controlled by the security analytics platform based on a digital asset type associated with the first digital asset.

* * * * *